United States Patent
Gopalakrishnan et al.

(10) Patent No.: US 12,036,441 B2
(45) Date of Patent: *Jul. 16, 2024

(54) FEATURE ESTIMATION OF A CRICKET GAME

(71) Applicant: RAPSODO PTE. LTD., Singapore (SG)

(72) Inventors: Roshan Gopalakrishnan, Singapore (SG); Saurabh Garg, Singapore (SG); Lodiya Radhakrishnan Vijayanand, Singapore (SG); Batuhan Okur, Singapore (SG)

(73) Assignee: Rapsodo Pte. Ltd., Singapore (SG)

( * ) Notice: Subject to any disclaimer, the term of this patent is extended or adjusted under 35 U.S.C. 154(b) by 250 days.

This patent is subject to a terminal disclaimer.

(21) Appl. No.: 17/747,699

(22) Filed: May 18, 2022

(65) Prior Publication Data

US 2023/0372775 A1 Nov. 23, 2023

(51) Int. Cl.
*A63B 24/00* (2006.01)
*A63B 71/06* (2006.01)
*A63B 102/20* (2015.01)

(52) U.S. Cl.
CPC ...... *A63B 24/0021* (2013.01); *A63B 71/0605* (2013.01); *A63B 2024/0034* (2013.01); *A63B 2102/20* (2015.10); *A63B 2220/05* (2013.01); *A63B 2220/35* (2013.01); *A63B 2220/807* (2013.01); *A63B 2220/89* (2013.01)

(58) Field of Classification Search
CPC ................ A63B 2102/20; A63B 2220/89
See application file for complete search history.

(56) References Cited

U.S. PATENT DOCUMENTS

| | | | | |
|---|---|---|---|---|
| 9,555,284 | B2* | 1/2017 | Vollbrecht | A63B 24/0021 |
| 10,596,416 | B2* | 3/2020 | Forsgren | G01S 13/587 |
| 10,721,384 | B2* | 7/2020 | Schwager | H04N 23/72 |
| 10,898,757 | B1* | 1/2021 | Johansson | G01S 13/867 |
| 10,989,791 | B2* | 4/2021 | Tuxen | G01S 13/536 |

(Continued)

FOREIGN PATENT DOCUMENTS

| | | |
|---|---|---|
| GB | 2274756 | 8/1994 |
| WO | WO 2012/027776 | 3/2012 |
| WO | WO 2018/076065 | 5/2018 |

OTHER PUBLICATIONS

United Kingdom Search Report and Examination Report issued in corresponding application No. 2209413.0, dated Dec. 28, 2022.

(Continued)

*Primary Examiner* — Jay Trent Liddle
(74) *Attorney, Agent, or Firm* — Fish & Richardson P.C.

(57) ABSTRACT

A cricket sensor may include one or more first image-capturing sensors configured to capture image data of a pitching motion of a bowler and image data of an initial motion of a cricket ball at a bowling end of a cricket field. The cricket sensor may include one or more second image-capturing sensors configured to capture image data of a trajectory and a flight path of the cricket ball towards a batting end of the cricket field. The cricket sensor may also include one or more first radar sensors configured to capture radar data describing one or more initial launch parameters of the cricket ball related to the trajectory and the flight path of the cricket ball towards the batting end of the cricket field.

19 Claims, 4 Drawing Sheets

(56) References Cited

U.S. PATENT DOCUMENTS

| | | | |
|---|---|---|---|
| 2009/0067670 A1 | 3/2009 | Johnson et al. | |
| 2011/0286632 A1 | 11/2011 | Tuxen et al. | |
| 2017/0054950 A1 | 2/2017 | Yeo et al. | |
| 2018/0156914 A1 | 6/2018 | Tuxen et al. | |
| 2018/0272221 A1* | 9/2018 | Sundararajan | G09B 9/00 |
| 2019/0347956 A1* | 11/2019 | Daga | G16H 40/67 |
| 2019/0391254 A1 | 12/2019 | Asghar et al. | |
| 2020/0298092 A1 | 9/2020 | Okur et al. | |
| 2022/0343514 A1* | 10/2022 | Jayaram | G06T 7/248 |
| 2022/0345660 A1* | 10/2022 | Jayaram | G06T 7/73 |
| 2022/0401841 A1* | 12/2022 | Ghanchi | A63F 13/65 |
| 2023/0100572 A1* | 3/2023 | Jayaram | G06T 19/00 345/419 |
| 2023/0196770 A1* | 6/2023 | Anton | G06F 3/16 382/103 |
| 2023/0372776 A1 | 11/2023 | Gopalakrishnan et al. | |

OTHER PUBLICATIONS

AU Patent Examination Report No. 1 dated Aug. 2, 2023 as received in Application No. 2022211820.
Hawkeye Innovations, hawkeyeinnovations.com/our-technology (retrieved May 18, 2022).
myBall.Biz, https://myball.biz/ (retrieved May 18, 2022).
Trackman, www.trackman.com/golf/trackman-4 (retrieved May 18, 2022).
Products.pitchvision.com [online], "Pitch Vision," available on or before May 17, 2022, via Internet Archive: Wayback Machine URL <https://web.archive.org/web/20220517074817/products.pitchvision.com/product/pv-one/>, retrieved on May 8, 2024, URL<products.pitchvision.com/product/pv-one/>, 8 pages.

* cited by examiner

FEATURE ESTIMATION OF A CRICKET GAME

The present disclosure generally relates to feature estimation of a cricket game.

BACKGROUND

A game of cricket may include a cricket field that has a bowling end, a cricket pitch, and a batting end. A first wicket including three stumps may be positioned at the bowling end, and a second wicket may be positioned at the batting end. A bowler may deliver a cricket ball from the bowling end towards the second wicket at the batting end, and a batter positioned in front of the second wicket at the batting end may hit the delivered cricket ball using a cricket bat.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a device with sensors to estimate the features of a cricket game may include one or more first image-capturing sensors configured to capture image data of a ball delivery of a bowler and image data of an initial motion of a cricket ball at the bowling end of a cricket field. The cricket sensor may also include one or more second image-capturing sensors configured to capture image data of a trajectory and a flight path of the cricket ball towards the batting end of the cricket field. The cricket sensor may additionally include one or more first radar sensors configured to capture radar data describing one or more initial launch parameters of the cricket ball related to the trajectory and the flight path of the cricket ball towards the batting end of the cricket field.

According to one or more embodiments, a method may include obtaining, by one or more radar sensors of a cricket sensor, radar data describing one or more motion parameters of a bowler and a cricket ball held by the bowler. The method may also include determining whether a bowling action has occurred based on the radar data. The method may additionally include obtaining, by one or more image-capturing sensors, image data of the bowler and image data of the cricket ball responsive to determining the bowling action has occurred and obtaining, by one or more additional radar sensors, radar data of the bowler and radar data of the cricket ball responsive to determining the bowling action has occurred. The method may include generating a three-dimensional motion representation of the bowler and the cricket ball.

In these and other embodiments, a system may include an image processor configured to obtain and process the image data captured by the first image-capturing sensors and the second image-capturing sensors and a radar processor configured to obtain and process the radar data captured by the first radar sensors. The system may also include a power supply comprising a charging interface and one or more batteries and a communication module. The system may also include the cricket sensor as described above. The system may additionally include a sensor data processor and memory in which the sensor data processor is configured to perform the above-described method.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the accompanying drawings in which.

DETAILED DESCRIPTION

Analyzing three-dimensional motion of an object, such as a cricket ball or a cricket bat, and/or players, in cricket games may be beneficial for form and/or technique training, umpiring decisions, and/or gameplay analysis. Radar technology may be used to detect and track the motion of the object and/or the players in cricket games. The radar technology may be used to measure various parameters of the object and/or the player such as a position, a direction of movement, a speed, and/or a velocity of the object and/or the player. Additionally, camera-based systems may be used to capture images of the object and/or the player such that motion of the object and/or the player may be correlated with images of the object and/or the player.

Existing motion-detection systems used in cricket games may be difficult to set up on a particular cricket field and include various disadvantages. Such motion-detection systems may be unwieldy, include numerous components, and/or be highly complex to set up. For example, some motion-detection systems, such as a HAWK-EYE system, use multiple cameras (e.g., ten or more cameras) installed in various locations around the cricket field to capture images of a cricket game. As another example, motion-detection systems, such as a PITCHVISION system, employ ground-based sensor mats to determine and analyze important parameters associated with motion of the cricket ball, such as a pitching point on the ground, a length of a bowled delivery of the cricket ball, a bounce of the cricket ball, etc. As such, existing motion-detection systems for cricket may not provide a holistic three-dimensional representation of the motion of the bowler and/or the cricket ball in a manner that complies with the rules of cricket.

The present disclosure may relate to, among other things, a method and/or a system including one or more combined radar-camera sensor units ("cricket sensors") configured to capture radar data and image data relating to motion of one or more objects, such as a cricket ball, cricket bat, and/or motion of one or more players in a cricket game. The cricket sensors according to the present disclosure may provide a more holistic representation of three-dimensional motion of the objects and/or the players during training and/or live cricket games that requires fewer and/or quicker calibration steps relative to existing motion-detection systems. Additionally, or alternatively, the cricket sensors may reduce the complexity of motion detection and provide a low-cost, cheaper, more portable, and/or easier to install motion-detection system relative to existing motion-detection systems. Additionally, or alternatively, the cricket sensors according to the present disclosure may include flexible and/or scalable costs between low-cost versions of the cricket sensors and high-cost versions of the cricket sensors.

Figure 1A:
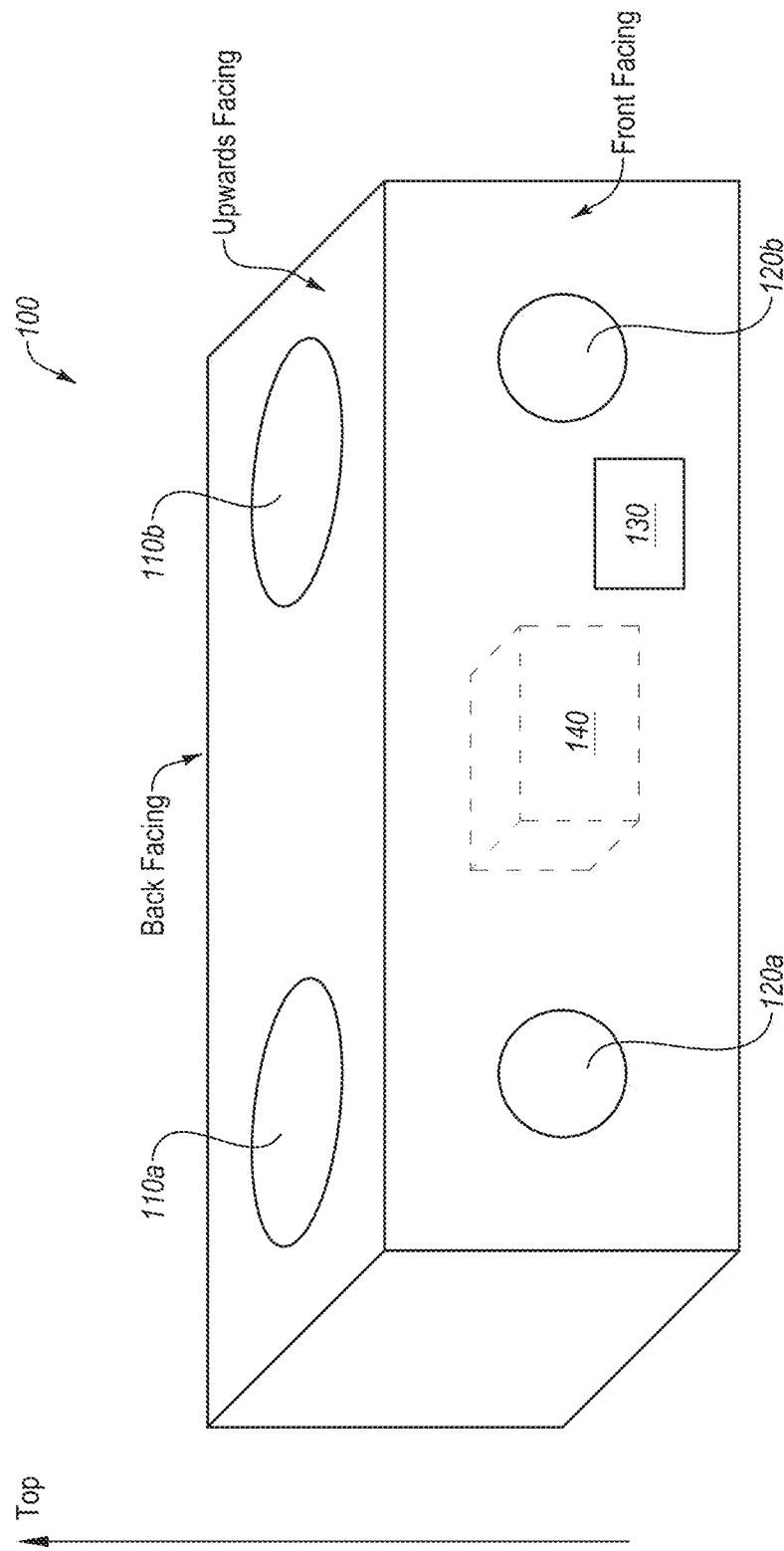
FIG. 1A illustrates an example embodiment of a cricket sensor according to the present disclosure.

FIG. 1A illustrates an example embodiment of a cricket sensor 100 according to the present disclosure. The cricket sensor 100 may be positioned at a bowling end of the cricket field and oriented to face a batting end of the cricket field, as further described in conjunction with FIG. 2B. In this and other orientations, the cricket sensor 100 may include one or more image-capturing sensors 110*a* and 110*b* positioned on an upwards-facing surface of the cricket sensor 100 (collectively "upwards-facing image-capturing sensors 110") such that the upwards-facing image-capturing sensors 110 are oriented towards and one or more image-capturing sensors 120*a* and 120*b* positioned on a surface of the cricket sensor 100 facing the batting end of the cricket field (collectively "front-facing image-capturing sensors 120"). Additionally, or alternatively, the cricket sensor 100 may include a first radar sensor 130 oriented in the same or a similar direction as the front-facing image-capturing sensors 120. In these and other embodiments, the cricket sensor 100 may include a second radar sensor 140 oriented in a direction opposite to or substantially opposite to the orientation of the first radar sensor 130.

Although the image-capturing sensors 110 and 120 and the radar sensors 130 and 140 are illustrated and described with particular positions and/or orientations on the cricket sensor 100, the configuration of the image-capturing sensors 110 and/or 120 and/or the radar sensors 130 and/or 140 may be adjusted depending on the environment in which the cricket sensor 100 is to be used. For example, the image-capturing sensors 110 and/or 120 and/or the radar sensors 130 and/or 140 may be positioned on different surfaces of the cricket sensor 100 and/or facing different directions than as illustrated and described in relation to FIG. 1A. Additionally, or alternatively, although the cricket sensor 100 is illustrated and described as having surfaces such as an upwards-facing surface, a front-facing surface, etc. configured in a rectangular prism shape, the cricket sensor 100 may include different shapes and/or profiles. For example, the cricket sensor 100 may include a cylindrical shape, a pyramidal shape, a hexagonal prism shape, or any other shape depending on the anticipated positions and/or orientations of one or more of the sensors 110-140.

Figure 2:
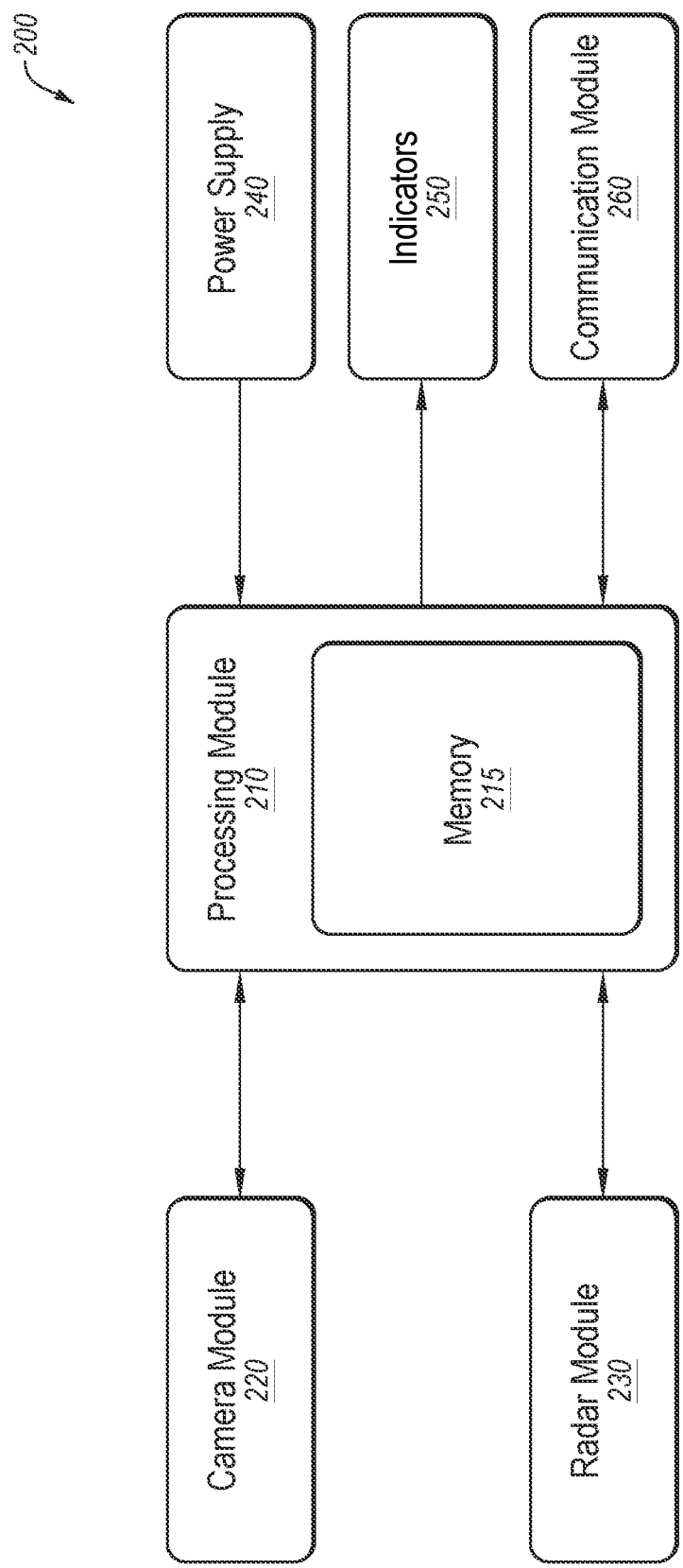
FIG. 2 is a diagram illustrating an example embodiment of a computing system configured to analyze three-dimensional motion of a bowler and/or a cricket ball according to the present disclosure.

The cricket sensor 100 may include a processor, a memory, and/or a communication device, such as a processing module 210, a memory 215, and/or a communication module 260 as further described in relation to FIG. 2. The operation of the cricket sensor 100 may be controlled by the processor, and the processor may be in communication with each of the other components of the cricket sensor 100. The components of the cricket sensor 100 may work cooperatively using one or both of radar data obtained by the radar sensors 130 and/or 140 and image data obtained by the image-capturing sensors 110 and/or 120 to analyze characteristics of a moving object. Any of the components of the cricket sensor 100 may be in communication with each other; for example, the radar sensors 130 and/or 140 may be in communication with the image-capturing sensors 110 and/or 120, and the image-capturing sensors 110 and/or 120 may be in communication with the memory and the communication device, etc. Additionally, while the cricket sensor 100 is illustrated as a unitary device, one or more of the components may be distributed or may span across multiple devices.

In some embodiments, the cricket sensor 100 may be configured to obtain image data and/or radar data at a designated framerate. For example, the cricket sensor 100 may be configured to capture an image and/or sample radar data once per second, once per ten seconds, once per thirty seconds, once per minute, etc. Increasing the framerate of the cricket sensor 100 may improve the accuracy of modeling the motion of a bowler and/or a cricket ball and/or facilitate capturing more details about the motion of the moving objects, while decreasing the framerate of the cricket sensor 100 may reduce power consumption of the cricket sensor 100. In these and other embodiments, the framerate of the cricket sensor 100 may be designated based on user input. Additionally, or alternatively, the framerate of the cricket sensor 100 may be controlled by a processor based on operation of the cricket sensor 100. For example, a particular processor may be configured to increase the framerate of a particular cricket sensor in response to determining an insufficient amount of image data and/or radar data is being obtained by the particular cricket sensor. In this example, the particular processor may be configured to decrease the framerate of the particular cricket sensor in situations in which the processor determines energy should be conserved (e.g., when a battery providing energy to the particular cricket sensor is running low).

The image-capturing sensors 110 and/or 120 may include any device, system, component, or collection of components configured to capture images. The image-capturing sensors 110 and/or 120 may include optical elements such as, for example, lenses, filters, holograms, splitters, etc., and an image sensor upon which an image may be recorded. Such an image sensor may include any device that converts an image represented by incident light into an electronic signal. The image sensor may include a plurality of pixel elements, which may be arranged in a pixel array (e.g., a grid of pixel elements); for example, the image sensor may comprise a charge-coupled device (CCD) or complementary metal-oxide-semiconductor (CMOS) image sensor. The pixel array may include a two-dimensional array with an aspect ratio of 1:1, 4:3, 5:4, 3:2, 16:9, 10:7, 6:5, 9:4, 17:6, etc., or any other ratio. The image sensor may be optically aligned with various optical elements that focus light onto the pixel array, for example, a lens. Any number of pixels may be included such as, for example, eight megapixels, 15 megapixels, 20 megapixels, 50 megapixels, 100 megapixels, 200 megapixels, 600 megapixels, 1000 megapixels, etc.

The image-capturing sensors 110 and/or 120 may operate at certain framerates or be able to capture a certain number of images in a particular period of time. The image-capturing sensors 110 and/or 120 may operate at a framerate of greater than or equal to about 30 frames per second. In a specific example, image-capturing sensors 110 and/or 120 may operate at a framerate between about 100 and about 300 frames per second. In some embodiments, a smaller subset of the available pixels in the pixel array may be used to allow for the image-capturing sensors 110 and/or 120 to operate at a higher framerate; for example, if the moving object is known or estimated to be located in a certain quadrant, region, or space of the pixel array, only that quadrant, region, or space may be used in capturing the image allowing for a faster refresh rate to capture another image. Using less than the entire pixel array may allow for the use of less-expensive image-capturing sensors while still enjoying a higher effective framerate.

Various other components may also be included in the image-capturing sensors 110 and/or 120. Such components may include one or more illuminating features such as a flash or other light source, a light diffuser, or other components for illuminating an object. In some embodiments, the illuminating features may be configured to illuminate the moving object when it is proximate the image sensor, for example, when the moving object is within three meters of the image sensor.

In some embodiments, the upwards-facing image-capturing sensors 110 may include one or more image-capturing sensors that each use a wide-angle lens to collect image data relating to a bowler. The upwards-facing image-capturing sensors 110 may be configured to capture images that may depict initial launch parameters of a cricket ball, such as a launch speed, a launch direction, a spin, etc. In these and other embodiments, the initial launch parameters of the cricket ball may be determined based on details included in the images captured by the upwards-facing image-capturing sensors 110. For example, a particular image may include a pitching motion of the bowler and/or an initial motion of the cricket ball leaving the bowler's hand, which may facilitate determining initial launch parameters of the cricket ball, such as the launch direction. As another example, a particular image captured by the upwards-facing image-capturing sensors 110 may indicate an initial momentum of the cricket ball based on the running speed of the bowler before the cricket ball is delivered.

Additionally, or alternatively, the upwards-facing image-capturing sensors 110 may include an adjustable framerate such that multiple images may be captured in sequence for each bowling action performed by the bowler. Capturing multiple images for a particular bowling action may facilitate determining some initial launch parameters that may not be ascertainable based on a single image of the bowling action. For example, a series of five images may be captured by the upwards-facing image-capturing sensors 110 over the course of a particular bowling action from an initial arm wind-up by the bowler to a release of the cricket ball from the bowler's hand. Based on the series of five images and the framerate of the upwards-facing image-capturing sensors 110, initial launch parameters such as the initial launch speed of the cricket ball and/or the spin of the cricket ball may be more accurately determined in comparison to a single image.

In some embodiments, the front-facing image-capturing sensors 120 may include one or more image capturing sensors that each use a telephoto lens. The positioning, orientation, and/or technical specification of the front-facing image-capturing sensors 120 may facilitate capturing images of the cricket ball mid-delivery (e.g., after the cricket ball leaves the bowler's hand and is in motion towards the batting end of the cricket pitch). As such, the images captured by the front-facing image-capturing sensors 120 may be used to determine ballistic parameters of the cricket ball, such as a trajectory, a flight path, a launch speed, a launch angle, etc. of the cricket ball. In these and other embodiments, the front-facing image-capturing sensors 120 may include an adjustable framerate such that the front-facing image-capturing sensors 120 may capture multiple images in sequence relating to a particular flight of the cricket ball. By capturing multiple images for the same flight of the cricket ball, the front-facing image-capturing sensors 120 may improve the accuracy of determining the ballistic parameters corresponding to the cricket ball.

The radar sensors 130 and/or 140 may include any system, component, or series of components configured to transmit one or more microwaves or other electromagnetic waves towards a moving object (e.g., a bowler and/or a delivered cricket ball) and receive a reflection of the transmitted microwaves back, reflected off of the moving object. The radar sensors 130 and/or 140 may include a transmitter and a receiver. The transmitter may transmit a microwave through an antenna towards the moving object. The receiver may receive the microwave reflected back from the moving object. The radar sensors 130 and/or 140 may operate based on techniques of Pulsed Doppler, Continuous Wave Doppler, Frequency Shift Keying Radar, Frequency Modulated Continuous Wave Radar, or other radar techniques as known in the art. The frequency shift of the reflected microwave may be measured to derive a radial velocity of the moving object, or in other words, to measure the speed at which the moving object is traveling towards the radar sensors 130 and/or 140. The radial velocity may be used to estimate the speed of the moving object, the velocity of the moving object, the distance between the moving object and the radar sensors 130 and/or 140, the frequency spectrum of the moving object, etc.

The radar sensors 130 and/or 140 may also include any of a variety of signal processing or conditioning components; for example, the radar sensors 130 and/or 140 may include an analog front end amplifier and/or filters to increase the signal-to-noise ratio (SNR) by amplifying and/or filtering out high frequencies or low frequencies, depending on the moving object and the context in which the radar sensors 130 and/or 140 is being used. In some embodiments, the signal processing or conditioning components may separate out low and high frequencies and may amplify and/or filter the high frequencies separately and independently from the low frequencies. In some embodiments, the range of motion of the object may be a few meters to tens of meters, and thus, the radar bandwidth may be narrow.

In some embodiments, the cricket sensor 100 may include the front-facing radar sensor 130 configured to capture the ballistic parameters of the cricket ball during flight. The ballistic parameters captured by the front-facing radar sensor 130 may include the same or similar ballistic parameters as determined based on the images captured by the front-facing image-capturing sensors 120. For example, the front-facing radar sensor 130 may capture parameters such as the launch speed, the launch direction, and/or the spin of the cricket ball. In these and other embodiments, the ballistic parameters captured by the front-facing radar sensor 130 may be paired with and/or compared to the images captured by the front-facing image-capturing sensors 120 and/or the images captured by the upwards-facing image-capturing sensors 110 to verify and/or improve the accuracy of the initial launch parameters and/or the ballistic parameters.

Additionally, or alternatively, pairing the radar data captured by the front-facing radar sensor 130 and the images captured by any of the image-capturing sensors 110 and/or 120 may facilitate three-dimensional modeling of the motion of the cricket bowler and/or the delivered cricket ball. In some embodiments, including a stereo pair of image-capturing sensors, such as the stereo pair of upwards-facing image-capturing sensors 110a and 110b or the stereo pair of front-facing image-capturing sensors 120a and 120b, may improve depth perception of objects, such as the delivered cricket ball, included in the captured images and facilitate three-dimensional modeling of the objects. The radar data associated with the same objects may be chronologically paired with the captured image data such that an image captured at a particular point in time is paired with radar data captured at the same particular point in time to facilitate three-dimensional modeling of the motion of the objects.

In some embodiments, the second radar sensor 140 may be positioned on an opposite side of the cricket sensor 100 from the front-facing radar sensor 130. For example, the second radar sensor 140 may be positioned on the cricket sensor 100 such that the second radar sensor 140 faces the bowling end of the cricket pitch, while the front-facing radar sensor 130 is oriented on a surface of the cricket sensor 100 to face the batting end of the cricket pitch. The second radar sensor 140 may be configured to capture one or more motion parameters of the bowler (e.g., running speed of the bowler, stopping location of the bowler, etc.) before the bowler has delivered the cricket ball towards the batting end.

In these and other embodiments, the radar data captured by the second radar sensor 140 may be referenced as one or more trigger mechanisms that prompt the upwards-facing image-capturing sensors 110, the front-facing image-capturing sensors 120, and/or the front-facing radar sensors 130 to begin collecting sensor data. For example, a particular trigger mechanism may include a threshold relating to one or more motion parameters of the bowler (e.g., the bowler moving faster than five meters per second). A particular processor, such as a processing module 210 as described in relation to FIG. 2, may compare the radar data captured by the second radar sensor 140 against one or more predetermined trigger mechanisms to determine whether the upwards-facing image-capturing sensors 110, the front-facing image-capturing sensors 120, and/or the front-facing radar sensors 130 should begin collecting sensor data. Additionally, or alternatively, the particular processor may signal the upwards-facing image-capturing sensors 110, the front-facing image-capturing sensors 120, and/or the front-facing radar sensors 130 to begin collecting sensor data in response to the second radar sensor 140 detecting any movement of the bowler.

Figure 1B:
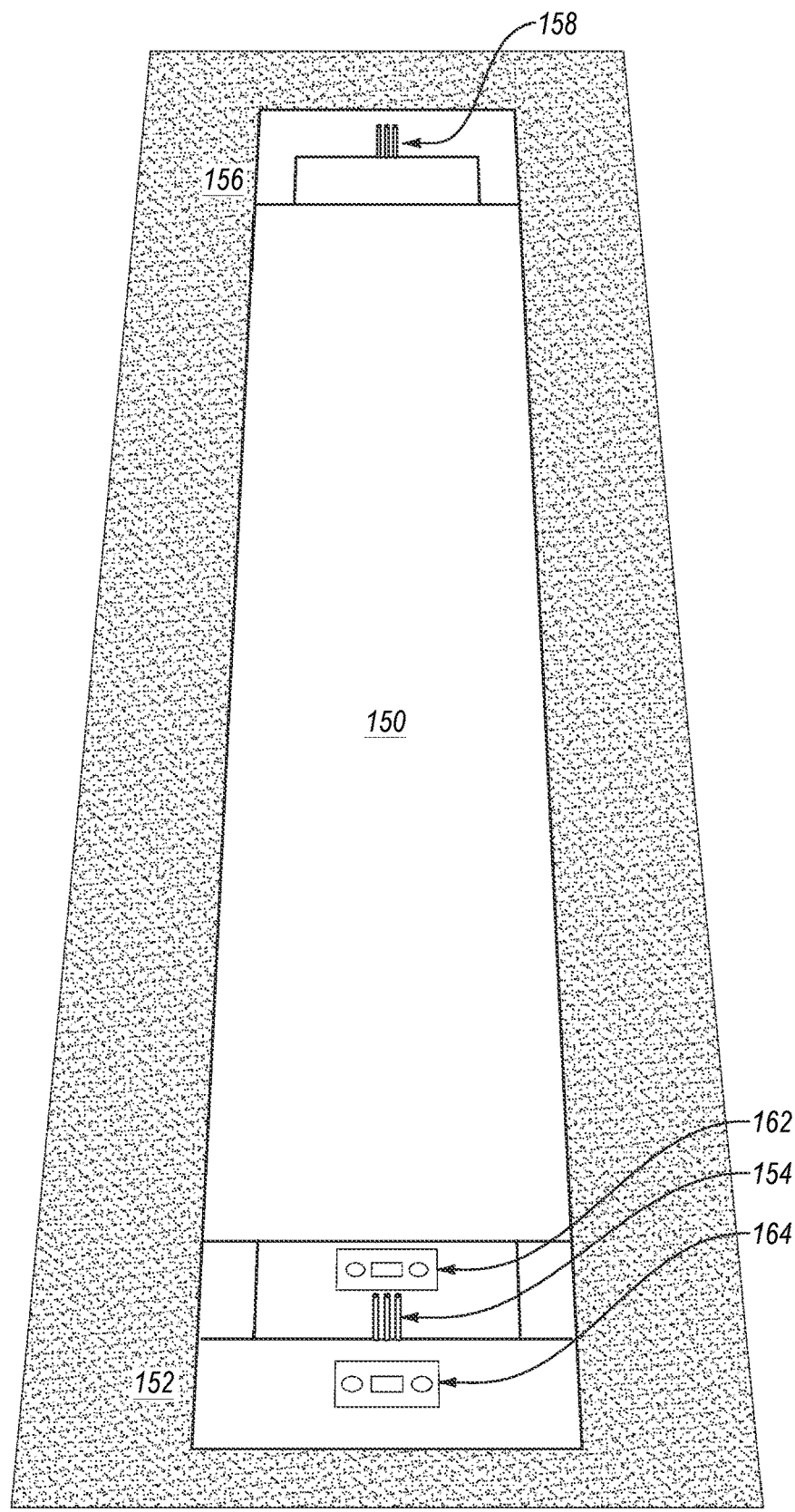
FIG. 1B illustrates a cricket field that includes the cricket sensor according to the present disclosure placed at different locations on the cricket field.

FIG. 1B illustrates a cricket pitch 150 on which a cricket sensor, such as the cricket sensor 100, may be placed at different locations according to the present disclosure. The cricket pitch 150 may include a bowling end 152 at which a first wicket 154 may be positioned and a batting end 156 at which a second wicket 158 may be positioned. In some embodiments, placement of the cricket sensor 100 on the cricket pitch 150 may depend on multiple factors. For example, the cricket sensor 100 may be placed at a first location 162 on the cricket pitch 150 such that the image-capturing sensors and/or the radar sensors included on the cricket sensor 100 have a clear line of sight to the bowler and/or the cricket ball. Additionally, or alternatively, the placement of the cricket sensor 100 at the first location 162 may prevent the cricket sensor 100 from obstructing movement of the bowler. As another example, the cricket sensor 100 may be placed at a second location 164 behind the first wicket 154 to comply with rules of a cricket game, which may restrict the locations at which the cricket sensor 100 may be placed (e.g., relative to a training environment with no rules regarding cricket sensor placement).

Modifications, additions, or omissions may be made to the cricket sensor 100 without departing from the scope of the disclosure. The designation of different elements in the manner described is meant to help explain concepts described herein and is not limiting. For example, elements of the cricket sensor 100 may be implemented within other systems or contexts than those described. For example, the upwards-facing image-capturing sensors 110, the front-facing radar-capturing sensors 120, the front-facing radar sensors 130, and/or the second radar sensor 140 may be positioned on different surfaces of the cricket sensor 100 and/or be oriented in different directions than those described.

FIG. 2 is a diagram illustrating an example embodiment of a computing system 200 configured to analyze three-dimensional motion of a bowler and/or a cricket ball according to the present disclosure. The computing system 200 may include a processing module 210, memory 215, a camera module 220, a radar module 230, a power supply 240, one or more indicators 250, and/or a communication module 260. Any or all of the cricket sensor 100 of FIG. 1A may be implemented as a computing system consistent with the computing system 200.

Generally, the processing module 210 may include any suitable computer, computing entity, or processing device including various computer hardware or software modules and may be configured to execute instructions stored on any applicable computer-readable storage media. For example, the processing module 210 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single unit in FIG. 2, it is understood that the processing module 210 may include any number of processing modules distributed across any number of network or physical locations that are configured to perform individually or collectively any number of operations described in the present disclosure. In some embodiments, the processing module 210 may interpret and/or execute program instructions and/or process data stored in the memory 215, the camera module 220, and/or the radar module 230. In some embodiments, the processing module 210 may fetch program instructions from a data storage and load the program instructions into the memory 215.

Figure 3:
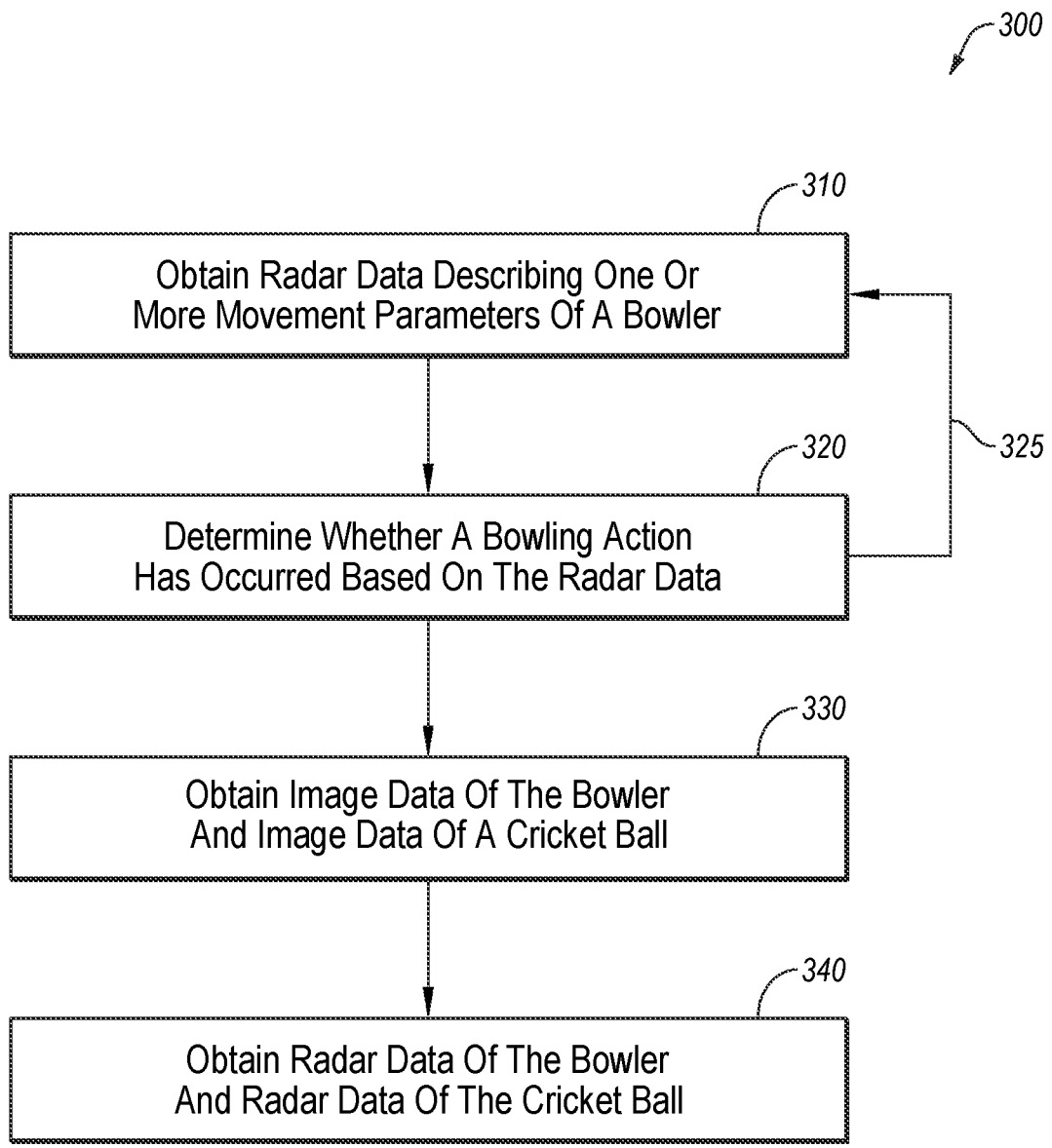
FIG. 3 is a flowchart of an example method of capturing sensor data associated with motion of a bowler and/or a cricket ball according to the present disclosure.

After the program instructions are loaded into the memory 215, the processing module 210 may execute the program instructions, such as instructions to perform the method 300 of FIG. 3. For example, the processing module 210 may capture image data associated with a moving object, capture radar data associated with the same moving object, pair each image datum with a corresponding radar datum, and/or generate one or more three-dimensional motion representations of the moving object.

The memory 215 may include computer-readable storage media or one or more computer-readable storage mediums for carrying or having computer-executable instructions or data structures stored thereon. Such computer-readable storage media may be any available media that may be accessed by a computer, such as the processing module 210. For example, the memory 215 may store obtained image data and/or radar data.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a computer. Combinations of the above may also be included within the scope of computer-readable storage media. Computer-executable instructions may include, for example, instructions and data configured to cause the processing module 210 to perform a certain operation or group of operations.

In some embodiments, the camera module 220 may be communicatively coupled with the upwards-facing image-capturing sensors 110 and/or the front-facing image-capturing sensors 120, and the radar module 230 may be communicatively coupled with the front-facing radar sensor 130 and/or the second radar sensor 140. In these and other embodiments, the camera module 220 and/or the radar module 230 may be configured to pre-process the sensor data collected by the image sensors and/or the radar sensors, respectively, and provide the pre-processed sensor data to the processing module 210 for data analysis. For example, the camera module 220 and/or the radar module 230 may analyze and revise the obtained image data and/or radar data prior to providing the data to the processing module 210. In some embodiments, pre-processing of the sensor data may include identifying and removing erroneous data. Image data and/or radar data obtained by the cricket sensor 100 including impossible data values (e.g., negative speed detected by a radar unit), improbable data values, noisy data, etc. may be deleted by the camera module 220 and/or the radar module 230 such that the deleted data is not obtained by the processing module 210. Additionally, or alternatively, the image data and/or radar data may include missing data pairings in which an image captured at a particular point in time has no corresponding radar data or vice versa; such missing data pairings may be deleted during data pre-processing. In these and other embodiments, the image data pre-processing and/or the radar data pre-processing may include converting the data obtained by the cricket sensor 100 into a format that the processing module 210 may use for analysis of the pre-processed image data and/or radar data.

In some embodiments, the power supply 240 may include one or more batteries and one or more charging interfaces corresponding to the batteries. For example, the batteries may be rechargeable batteries, and the charging interface may include a charging port, a solar panel, and/or any other interface for charging the batteries. Additionally, or alternatively, the batteries may not be rechargeable (e.g., disposable batteries), and the power supply 240 may not include a charging interface.

In some embodiments, the indicators 250 may include a graphical user interface (GUI) that allows a user to better understand, calibrate, and/or otherwise use the cricket sensor 100. For example, the indicators 250 may be displayed on a LED screen and report system levels and/or stages for radar data capture triggers, image data capture triggers, device battery life, latest recorded parameters, and/or any other stats relating to operation of the cricket sensor 100.

The communication module 260 may include any component, device, system, or combination thereof that is configured to transmit or receive information over a network. In some embodiments, the communication module 260 may communicate with other devices at other locations, the same location, or even other components within the same system. For example, the communication module 260 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, an LTE device, an LTE-A device, cellular communication facilities, or others), and/or the like. The communication module 260 may permit data to be exchanged with a network and/or any other devices or systems described in the present disclosure. For example, the communication module 260 may allow the system 200 to communicate with other systems, such as computing devices and/or other networks.

One skilled in the art, after reviewing this disclosure, may recognize that modifications, additions, or omissions may be made to the system 200 without departing from the scope of the present disclosure. For example, the system 200 may include more or fewer components than those explicitly illustrated and described.

FIG. 3 is a flowchart of an example method 300 of capturing sensor data associated with motion of a bowler and/or a cricket ball according to the present disclosure. The method 300 may be performed by any suitable system, apparatus, or device, including by processing logic that may be hardware, software, or a combination of hardware and software. For example, the cricket sensor 100 and/or the computing system 200 may perform one or more of the operations associated with the method 300. Although illustrated with discrete blocks, the steps and operations associated with one or more of the blocks of the method 300 may be divided into additional blocks, combined into fewer blocks, or eliminated, depending on the particular implementation.

The method 300 may begin at block 310 where processing logic obtains radar data describing one or more motion parameters of a bowler. The radar data obtained at block 310 may include the radar data of the bowler captured by the second radar sensor 140 as described above in relation to FIG. 1A.

At block 320, the processing logic may determine whether a bowling action has occurred based on the obtained radar data. In some embodiments, the radar data obtained at block 310 may be compared against one or more predetermined thresholds to decide whether the bowling action has occurred as described above in relation to FIG. 1A. Responsive to determining that a bowling action has not occurred, the processing logic may return to block 310, where additional radar data may be obtained. Responsive to determining that the bowling action has occurred, the operations of the method 300 may continue to block 330 and/or block 340.

At block 330, the processing logic may obtain image data of the bowler and/or image data of a cricket ball, and at block 340, the processing logic may obtain radar data of the bowler and/or radar data of the cricket ball. In some embodiments, obtaining the image data and the radar data may occur simultaneously in response to the processing logic determining that the bowling action has occurred at block 320 because the image data and the radar data may be captured simultaneously by image-capturing sensors and radar sensors, respectively, of a cricket sensor, such as the cricket sensor 100 described above in relation to FIG. 1A.

Modifications, additions, or omissions may be made to the operations of the method 300 without departing from the scope of the disclosure. For example, the designations of different elements in the manner described is meant to help explain concepts described herein and is not limiting. Further, the operations of the method 300 may include any number of other elements or may be implemented within other systems or contexts than those described.

The embodiments described in the present disclosure may include the use of a computer including various computer hardware or software modules. Further, embodiments described in the present disclosure may be implemented using computer-readable media for carrying or having computer-executable instructions or data structures stored thereon.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A cricket sensor, comprising:
   one or more first image-capturing sensors configured to capture image data of a bowler delivering a cricket ball and image data of an initial motion of the cricket ball from a bowling end of a cricket field;
   one or more second image-capturing sensors configured to capture image data of a trajectory and a flight path of the cricket ball towards a batting end of the cricket field; and
   one or more first radar sensors configured to capture radar data describing one or more initial launch parameters of the cricket ball related to the trajectory and the flight path of the cricket ball towards the batting end of the cricket field; and
   one or more second radar sensors configured to capture radar data describing one or more motion parameters of the bowler.

2. The cricket sensor of claim 1, wherein:
   the first image-capturing sensors are positioned on an upwards-facing surface of the cricket sensor;
   the second image-capturing sensors are positioned on a front-facing surface of the cricket sensor; and
   the first radar sensors are positioned on the front-facing surface of the cricket sensor.

3. The cricket sensor of claim 1, wherein the one or more second radar sensors are positioned on a surface of the cricket sensor oriented in an opposite direction from the one or more first radar sensors.

4. The cricket sensor of claim 1, further comprising a processor configured to identify a trigger mechanism based on the radar data captured by the one or more second radar sensors, wherein the one or more first image-capturing sensors, the one or more second image-capturing sensors, and the one or more first radar sensors are configured to capture sensor data in response to the processor identifying the trigger mechanism.

5. The cricket sensor of claim 1, wherein:
   the cricket sensor is positioned in front of a wicket at a bowling end of a cricket pitch; and
   the cricket sensor is oriented toward a batting end of the cricket pitch.

6. The cricket sensor of claim 1, wherein:
   the one or more first image-capturing sensors comprise a first pair of stereo camera sensors; and
   the one or more second image-capturing sensors comprise a second pair of stereo camera sensors.

7. The cricket sensor of claim 1, wherein:
   one or more of the one or more first image-capturing sensors includes wide-angle lenses; and
   one or more of the one or more second image-capturing sensor includes telephoto lenses.

8. The cricket sensor of claim 1, wherein the one or more initial launch parameters of the cricket ball comprise at least one of a launch speed, a launch direction, or a spin of the cricket ball.

9. A method, comprising:
   obtaining, by one or more radar sensors of a cricket sensor, radar data describing one or more motion parameters of a bowler delivering a cricket ball and the cricket ball delivered by the bowler;
   determining whether a bowling action has occurred based on the radar data;
   obtaining, by one or more image-capturing sensors, image data of the bowler and image data of the cricket ball responsive to determining the bowling action has occurred;
   obtaining, by one or more additional radar sensors, radar data of the bowler and radar data of the cricket ball responsive to determining the bowling action has occurred; and
   generating a three-dimensional motion representation of the bowler and the cricket ball.

10. The method of claim 9, wherein obtaining the image data of the bowler and the image data of the cricket ball comprises:
    obtaining, by one or more first image-capturing sensors, image data of a pitching motion of the bowler and image data of an initial motion of the cricket ball; and obtaining, by one or more second image-capturing sensors, image data of a trajectory and flight path of the cricket ball.

11. The method of claim 9, wherein the radar data of the bowler and the radar data of the cricket ball comprise radar data describing one or more initial launch parameters of the cricket ball, wherein the one or more initial launch parameters include at least one of a launch speed, a launch direction, or a spin of the cricket ball.

12. The method of claim 9, wherein determining whether a bowling action has occurred includes identifying, based on the one or more motion parameters of the bowler and the cricket ball, a point at which the cricket ball has been thrown by the bowler.

13. The method of claim 9, wherein determining whether a bowling action has occurred includes identifying, based on the one or more motion parameters of the bowler and the cricket ball, a point at which the bowler is about to throw the cricket ball.

14. A system, comprising:
  a cricket sensor, comprising:
    one or more first image-capturing sensors configured to capture image data of a pitching motion of a bowler delivering a cricket ball and image data of an initial motion of the cricket ball from a bowling end of a cricket field;
    one or more second image-capturing sensors configured to capture image data of a trajectory and a flight path of the cricket ball towards a batting end of the cricket field; and
    one or more first radar sensors configured to capture radar data describing one or more initial launch parameters of the cricket ball related to the trajectory and the flight path of the cricket ball towards the batting end of the cricket field;
  an image processor configured to obtain and process the image data captured by the first image-capturing sensors and the second image-capturing sensors;
  a radar processor configured to obtain and process the radar data captured by the one or more first radar sensors;
  a sensor data processor and memory, the sensor data processor being configured to:
    obtain, from the image processor, the image data of the bowler and the image data of the cricket ball;
    obtain, from the radar processor, the radar data describing the one or more initial launch parameters of the cricket ball related to the trajectory and the flight path of the cricket ball towards the batting end of the cricket field; and
    generate a three-dimensional motion model of the bowler and the cricket ball;
  a communication module; and
  a power supply comprising a charging interface and one or more batteries.

15. The system of claim 14, wherein:
  the one or more first image-capturing sensors are positioned on an upwards-facing surface of the cricket sensor;
  the one or more second image-capturing sensors are positioned on a front-facing surface of the cricket sensor; and
  the one or more first radar sensors are positioned on the front-facing surface of the cricket sensor.

16. The system of claim 14, further comprising one or more second radar sensors configured to capture radar data describing one or more motion parameters of the bowler.

17. The system of claim 16, wherein the second radar sensors are positioned on a surface of the cricket sensor oriented in an opposite direction from the one or more first radar sensors.

18. The system of claim 16, wherein the sensor data processor is further configured to identify a trigger mechanism based on the radar data captured by the one or more second radar sensors, wherein the one or more first image-capturing sensors, the one or more second image-capturing sensors, and the one or more first radar sensors are configured to capture sensor data in response to the sensor data processor identifying the trigger mechanism.

19. The system of claim 14, wherein:
  the one or more first image-capturing sensors comprise a first pair of stereo camera sensors; and
  the one or more second image-capturing sensors comprise a second pair of stereo camera sensors.

* * * * *